INVENTOR.
ROBERT H. THORNER

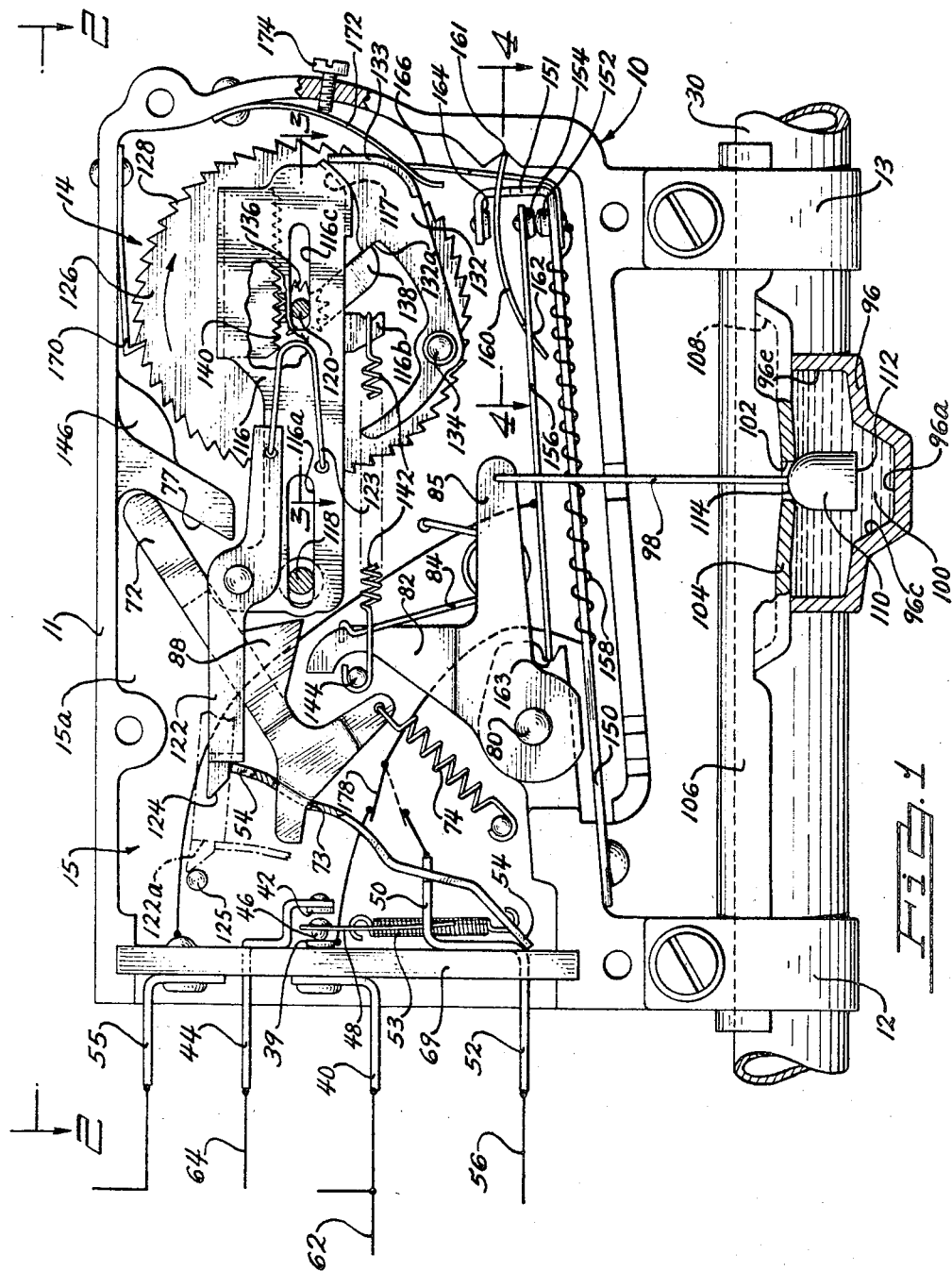

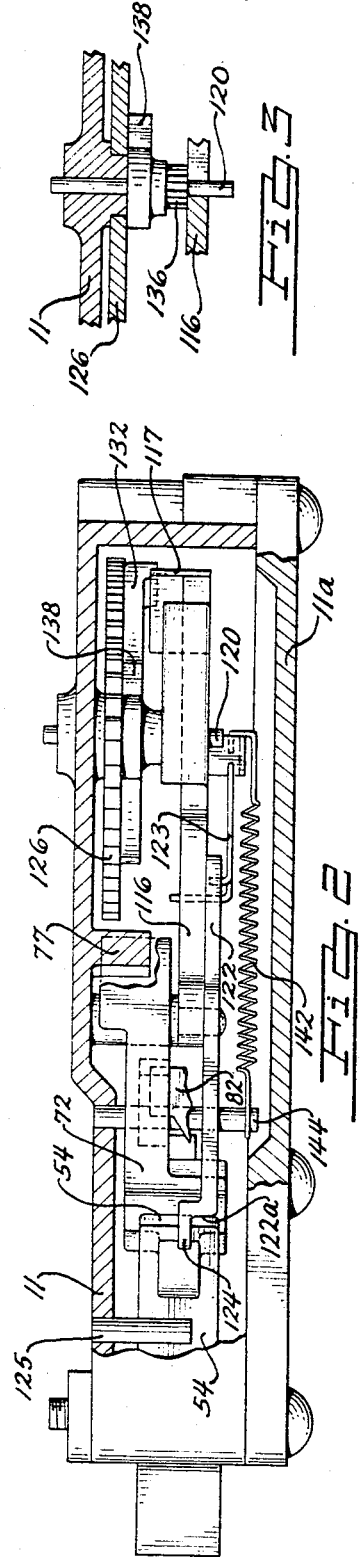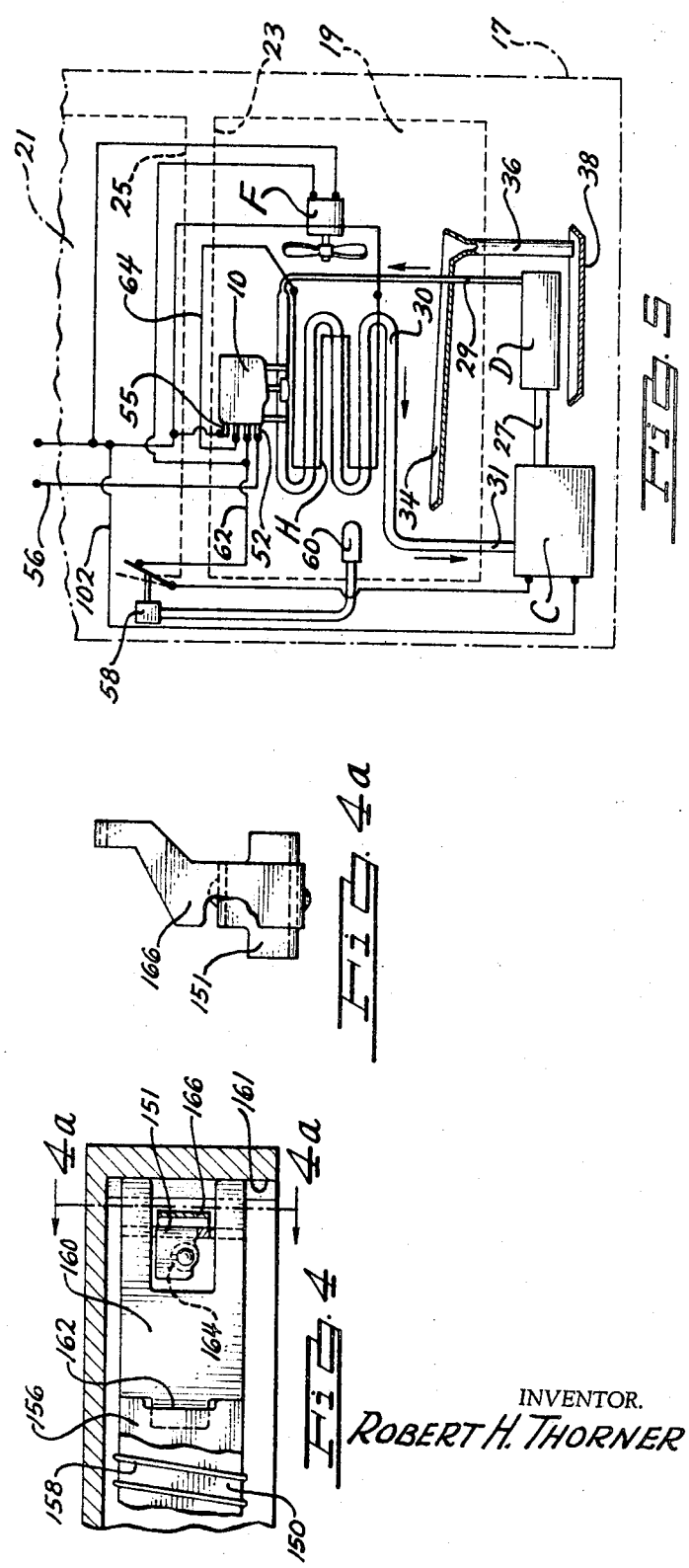

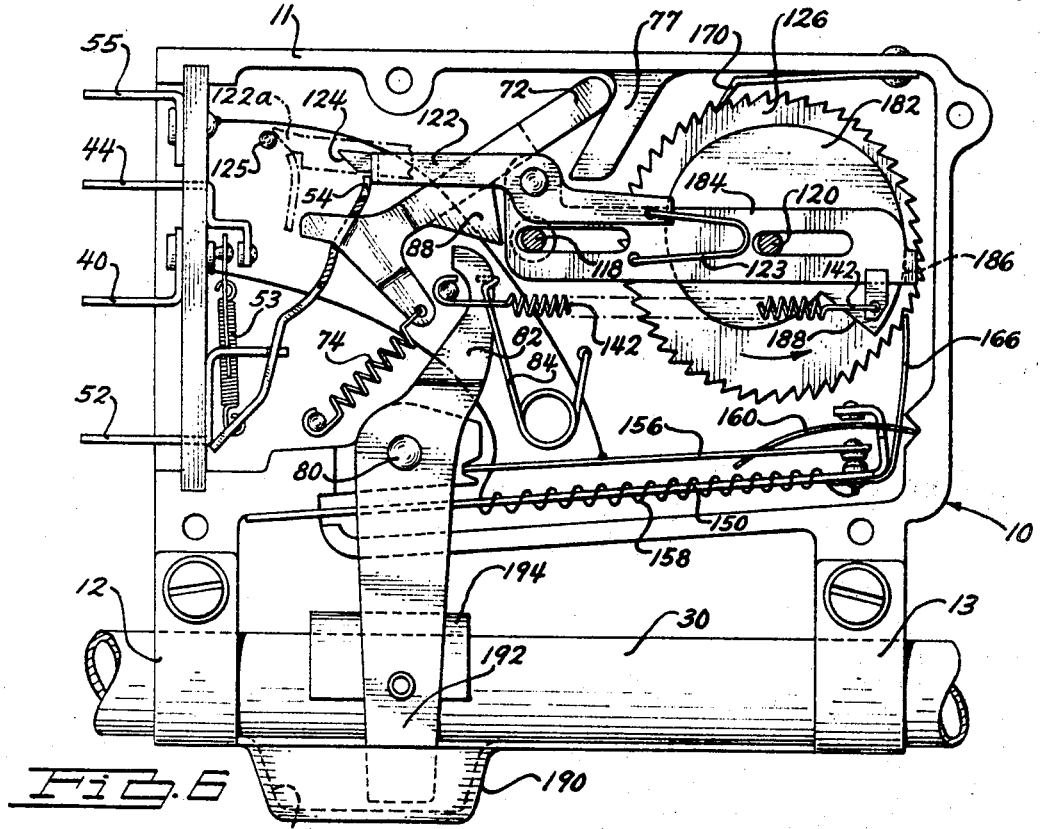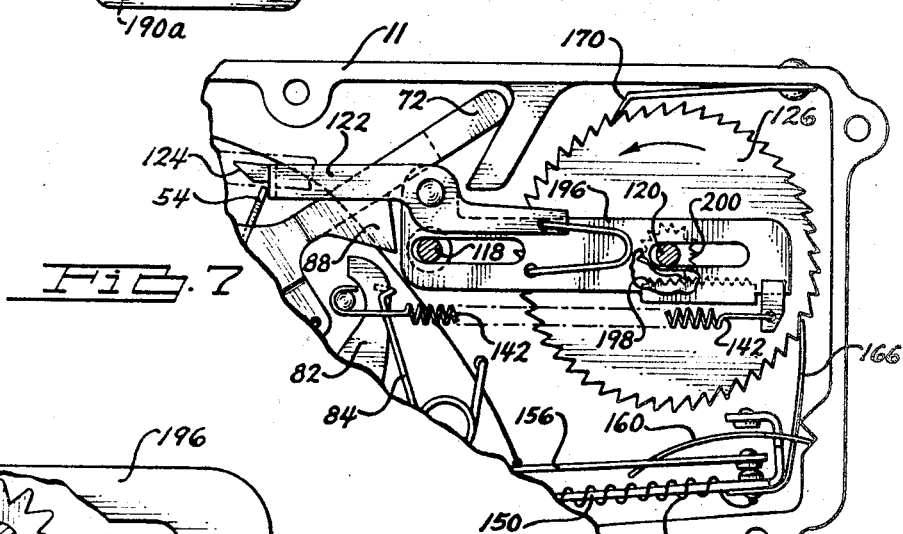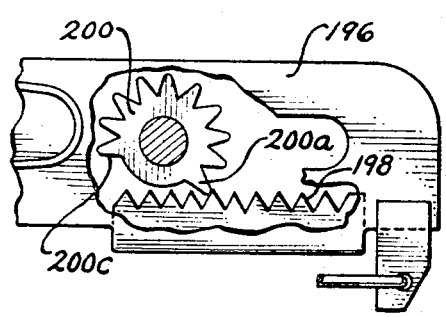

INVENTOR.
ROBERT H. THORNER

United States Patent Office 3,399,541
Patented Sept. 3, 1968

3,399,541
DEFROSTER CONTROL
Robert H. Thorner, 8750–F W. Chicago Blvd.,
Detroit, Mich. 48204
Continuation-in-part of application Ser. No. 373,762,
June 9, 1964, now Patent No. 3,350,894, dated
Nov. 7, 1967. This application Apr. 25, 1966, Ser.
No. 544,960
42 Claims. (Cl. 62—140)

ABSTRACT OF THE DISCLOSURE

The main disclosure relates to a refrigeration defrost control for regulating a heater to melt the frost formed on a refrigerator surface. In one form of the invention, initiation of the heater is effected by a bimetal-powered timer mechanism which stores energy through a spring escapement device to provide periodic defrost initiation at predetermined time intervals. The defroster control includes a duration control portion having a sensing member biased to abut some ice during the heating period and adapted to terminate the defrost action after a predetermined travel of the sensing member as the ice melts.

---

This application is a continuation-in-part of Ser. No. 373,762, filed June 9, 1964, now Patent No. 3,350,894, issued Nov. 7, 1967, and is related in subject matter to my prior applications, Ser. No. 342,216, filed Feb. 3, 1964, now Patent No. 3,321,928, issued May 30, 1967, which is a continuation of abandoned application No. 43,825 filed July 19, 1960 and a continuation-in-part of Ser. No. 100,137, filed Apr. 3, 1961, now Patent No. 3,256,707, issued June 21, 1966.

The present invention relates primarily to a control mechanism for refrigeration apparatus and particularly to a control device for regulating the formation and reduction of ice on a cooling unit, such as for defrosting systems of refrigerator apparatus.

In numerous refrigerating systems, means are provided to control the build-up and elimination (or reduction) of ice or frost which may form on the evaporator. These systems often include heating means to remove or reduce such formation of ice. In certain types of commercial refrigeration such as "ice-bank" systems, as well as in some defrosting systems, such removal means comprises merely a switch to turn the compressor off so that the ambient heat eventually diminishes the ice coating on the evaporator. For purposes of this disclosure, ice and frost can be considered synonymously, except where otherwise indicated.

Defrosting control systems are used to remove the frost that forms on the usual evaporator coils as well as on other parts or on food adjacent thereto in a refrigerator. Such frost is highly undesirable since it acts as an insulator for the normal extraction of heat from the food compartments to the cooling unit, thereby reducing the efficiency thereof. Accordingly it is desirable to remove the frost quickly without melting the food, ice cubes, etc. Hence it has been common practice to provide additional means to intermittently apply heat to the evaporator and adjacent parts for periodically removing such frost rapidly and automatically. One such defrosting means comprises a separate electric heater element adjacent the evaporator coil; another defrosting means comprises a solenoid-operated valve which acts to pass the compressed refrigerant (such as Freon) directly from the compressor to the evaporator while bypassing the condenser and capillary tube of the refrigerant circuit. The present invention is more specifically concerned, by way of example, with control means for initiating and terminating the intermittent action of the defrosting means of a refrigeration system.

The presently known defroster control devices provide either manual or automatic means to *initiate* the defrosting action. The manual means usually includes a push button so that initiation depends upon human decision. The presently used automatic initiating means frequently comprises a conventional timer or "clock" mechanism to start the defrosting action after a definite time interval, such as 4–6 hours, or after a predetermined total running time of the compressor, such as 2–3 hours, for example. All present defroster control devices provide automatic means to control the termination of the defrosting action. Such terminating means usually comprises a bimetallic "snap" element or a gas-filled bellows-type thermostat to shut off the defroster action when the evaporator temperature rises to a predetermined value. However, sometimes timing mechanisms are also used to control duration.

A novel means for terminating the defrosting action which senses ice formation is disclosed in the above-mentioned patent applications, and part of the present invention relates to improvements in the invention therein claimed.

Defroster control devices in recent years have become widely used in domestic refrigerators having a food freezer section that is separate from the so-called refrigerator or "fresh-food" section. The freezer section in such refrigerators is provided with a fan to circulate air over the evaporator coil and the frozen food products. A portion of this air also circulates through the fresh-food compartment to provide refrigeration therein in recent refrigerators. With this construction and with intermittent defrosting of the freezer evaporator, frost never forms on the food, and the melted frost from the evaporator coil is disposed of automatically.

Preferably the initiation and termination of a defrosting cycle, if correct, should not be a function of time alone, at least with present termination means responsive only to temperature. But the worst problems with present clock mechanisms is their complexity and relatively high cost, and they tend to become sufficiently noisy to require replacement because of wear in their fast-running gears. The use of clock means to initiate the defrosting action is acceptable if the cost can be reduced and the foregoing objections are overcome. A time-initiated defroster control is rendered acceptable particularly if the mechanism controlling the termination of the defrost period actually controls the duration of the heating action irrespective of the original thickness of frost on the evaporator unit.

For termination of the defrosting cycle, gas filled bellows which sense only temperature are not only costly, but the gas therein is adversely affected by variations in air density, Accordingly, altitude or air density compensation means frequently are provided to compensate for the low atmospheric pressures, such as normally existing at Denver, Colorado, for example. Also, the production consistency of present bimetal snap-disc temperature termination systems cannot be held closer than plus or minus 5 degrees F.

It should be appreciated, of course, that the melting of frost or frozen food is not only a function of temperature of the surrounding materials but a function of time as well. Frozen foods or frost will melt in a short time at high ambient temperature, but can withstand ambient temperatures of a few degrees above freezing for a relatively long time without deterioration.

Tests of the direct thickness-sensing defroster control disclosed in Ser. No. 373,762 have shown this type of device to provide the most accurate control of frost formation. While cost studies of this accurate device indicates that it can be competitive pricewise with present controls, my work with this defroster control has led to new concepts which enables startling simplicity and compactness. The main new concept was first disclosed in FIG. 2a of Ser. No. 373,762, and the intsant case is directed to substantial improvements thereof. The inherent simplicity and compactness enabled by these new concepts facilitates an extremely low-cost defroster control of very small size, although at some compromise in performance in relation to my direct-thickness measuring defroster controls. Hence, it appears, at the present time at least, that the more expensive and larger direct-thickness control will find its largest use in the higher priced dometsic refrigerator market, commercial refrigeration and any other application requiring measurement and control of thickness or depth of slow-forming material. The low-cost defroster controls of the present invention appear at the present time to be most useful in the moderate and low-price domestic refrigerator market as well as for air conditioning units which require defroster controls.

A main object of the present invention is to provide a mechanism to control the formation of frost or ice on a cooling surface of a refrigeration machine which is extremely simple and compact to enable low-cost manufacture of a defroster control of very small size.

A most important object of the present invention is to provide a mechanism to control the formation of frost or ice on a cooling surface of a refrigerating machine as described in the preceding paragraph in which means are provided to produce a relatively small amount of energy, and integrating means are provided to store the energy over a period of time to be released periodically for providing the relatively large amplified force for actuating the control means.

Another object of the present invention is to provide a mechanism to control the formation of frost on a cooling surface of a refrigerating machine as described in the preceding paragraph in which a heat-sensitive "clock" or timer mechanism provides the input energy for the integrating mechanism that includes counting means to enable initiation of the defrosting action after a predetermined time interval, which heat sensitive timer mechanism particularly in combination with the integrating mechanism has other applications in addition to controlling the formation of frost.

A further object of the present invention is to provide a mechanism to control the formation of frost or ice on a cooling surface of a refrigeration machine as described in either of the preceding two paragraphs in which the means to provide the small energy for the integrating mechanism includes novel heat sensitive means operating intermittently to provide the input energy.

Another object of the present invention is to provide a device to control the formation of frost or ice on a cooling surface of a refrigerating machine as described in the preceding paragraphs, in which novel field adjustments of the device are provided to vary the time interval between defrosting periods to compensate for wide variations in humidity, such as are found in New Orleans, La., compared to Denver, Colo., for example.

A very important object of the present invention is to provide an extremely simple, reliable, small, quiet and low-cost defroster control providing the novel heat-responsive timer or "clock" means to cause initiation of the frost-melting action solely after a predetermined time interval, as described in the preceding paragraphs, in combination with a novel ice-abutment means for controlling accurately the duration of the defrost heating period irrespective of the initial thickness of frost formed on the evaporator unit.

A further object of the present invention is to provide in an automatic defroster control system novel means to control the duration (and termination) of the defrosting action including a sensing member immersed in a vessel in the flow path of melted frost and including improved means to initiate the defrosting action when first starting the refrigerator after installation and in which system the vessel in one from may be installed at any point on the evaporator coil, or in another form may be installed away from the coil, irrespective of the formation of frost.

An additional object of the present is to provide a device to control the formation of frost or ice on a cooling surface of a refrigerating machine in which novel means are included to delay restarting the compressor after termination of the defrosting cycle.

Other objects and advantages of the invention will become apparent from the following description and from the accomapnying drawings, in which:

FIGURE 1 is an enlarged elevational view of the control device of the present invention (with its cover removed) for controlling the duration of the defrosting action by controlling the initiation and termination thereof;

FIG. 2 is an elevational view of the device of FIG. 1 with a portion of the housing cut away as would be seen along the line 2—2 of FIG. 1, with certain parts omitted for clarity;

FIG. 3 is a partial sectional view of important elements of the device shown in FIG. 2, to clarify its operation;

FIG. 4 is a partial sectional view of the device of FIG. 1 as would be seen along the line 4—4 of FIG. 1;

FIG. 4a is an elevational end view of important elements of the invention as seen along the line 4a—4a in FIG. 4 with certain parts not shown;

FIG. 5 is a somewhat diagrammatic illustration of a refrigerator having a freezer section with the device of the present invention shown in its operative relation to the several components of the refrigerator;

FIG. 6 is an enlarged elevational view of a modification of the form of the invention shown in FIG. 1;

FIG. 7 is a fragmentary enlarged elevational view of another modification of the form of the invention shown in FIG. 1;

FIG. 8 is an enlarged elevational fragmentary view of important details of the form of the invention shown in FIG. 7;

Figure 9:
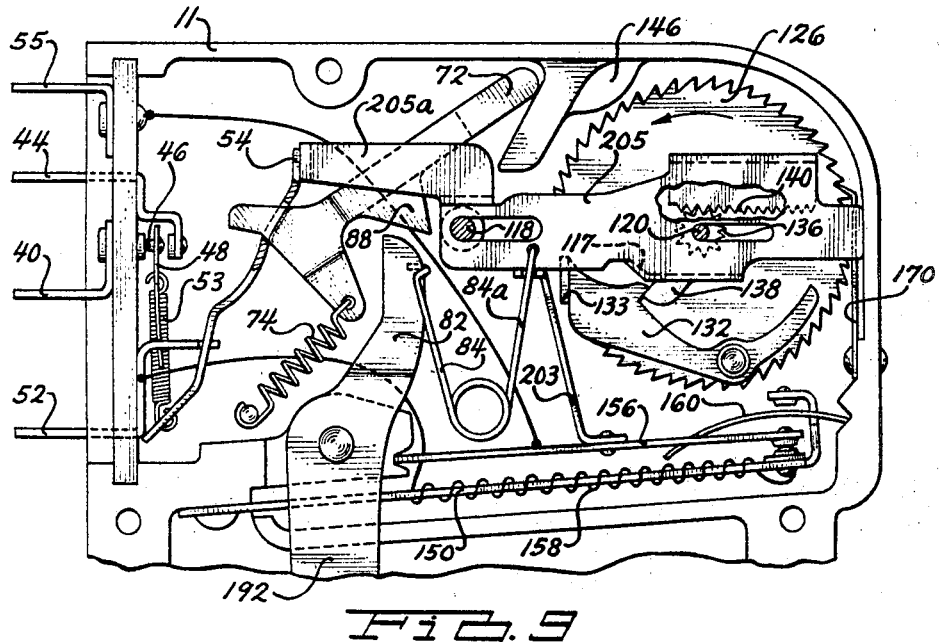
FIGS. 9, 10 and 11 are enlarged elevational fragmentary views of modifications of the forms of the invention shown in FIGS. 1, 6 and 7, respectively.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In accordance with the specific form of the invention shown herein, I provide an automatic defroster control for a refrigeration machine in which the detrimental factors of present controls such as relatively high cost, complexity, excessive noise, unreliability, inconsistency, and variations with air density are eliminated, and which will initiate the defrosting action periodically, and will melt substantially all the frost (without melting the frozen foods). I provide such desirable initiating action by an electro-mechanical construction in which an actuating member is intermittently operated by power means activated by a source of energy. The power means, in the form shown, is operated by a relatively small source of such energy or input power force intermittently applied to operate an integrating mechanism (which may be part of the power means) for converting and storing or adding up this small energy over a period of time and for releasing the stored energy periodically to produce an output force substantially larger than the original input power force to initiate the defrosting action upon each periodic energy release. Although any means for controlling the termination or duration of the defrosting cycle may be used and operated by the above-described initiating means, I have disclosed herein a novel means dependent on the melting of ice (illustrated as contained in a vessel) which in one form is located in the flow path of melting frost to control this duration; this novel termination means has special utility when used *in combination* with my novel cycle-initiating means in a manner to be described.

In another improvement which may be used in any forms of the present invention, I provide a novel ice vessel which in one form includes valve means to seal the vessel from the atmosphere except during the defrosting period. In this form of the invention, the vessel is prefilled with water at the factory, and is mounted in the flow-path of the melted frost to replenish the small amount of water that evaporates during the defrost periods when the valve is open. In another form of the invention, the vessel includes a layer of non-evaporating-liquid on top of the water or alone in addition to the sealing valve, so that the vessel can be mounted away from the evaporator coil providing it is subjected to the heat of the defrost heater.

Referring now to FIGS. 1–5 of the drawings, and particularly to FIG. 5, there is shown diagrammatically by way of example an installation of the present invention as a defroster control unit 10 in operative relation to a refrigeration machine and the electric circuits necessary for operation of the control unit. The entire defroster control is shown in FIGS. 1 and 2 encased in a housing 11, and includes a pair of legs or supports 12 and 13 adapted to be secured to the refrigerator at any suitable position on the frost-forming surface. The defroster control may be considered to comprise two components; one component comprises an initiating mechanism or means 14; and the second component comprises a termination mechanism 15 which controls the duration (or termination) of the defrosting action as shown in FIG. 1. In FIG. 5, a typical refrigeration machine such as a refrigerator is illustrated having a cabinet 17 (in dotted outline) forming a food freezer section 19 and a fresh food section 21 divided by walls 23 and 25. The refrigerant system includes the usual compressor C which sends the refrigerant through a tube 27 to a condenser D, thence through a capillary tube 29, to be expanded through a frozen food evaporator or cooling unit 30 of the usual tube coil construction, where it either returns under vacuum to the compressor through tube 31 or flows to a second evaporator (not shown) for the fresh food section 21, all in a manner well known to those skilled in the art. A conventional electric heater element H is mounted adjacent the evaporator coil 30. When the heater is energized, the heat caused by action of the defroster control 10 (to be described) quickly melts all the frost formed thereon. The melted frost drops into a trough 34 mounted at the back of the freezer section where the water flows through a tube 36 to a pan 38, where the heat of the condenser helps the melted frost to evaporate. In normal operation, the contents of the freezer section are cooled by air circulated by a small air fan F which causes air to circulate around the freezer section and over the evaporator 30 and frozen food. A portion or all of this fan-induced air-flow is directed to the fresh-food section by baffles (not shown) to provide refrigeration therein. The defroster control is secured to tube 30 by any suitable means, as by clamps and screws on legs 12 and 13 as illustrated.

Temporarily referring to FIG. 1, to be discussed in detail hereinafter, the termination mechanism 15 includes an electric switch having a fixed contact 39 connected to a terminal 40, and an opposed fixed contact 42 connected to a terminal 44. A movable contact 46 is carried by an arm 48 swingable about a knife edge connection in a support 50 which is connected to a stationary terminal 52. A strong extension spring 53 is connected at one end to the contact arm 48 and at its other end to an arm 54 which has knife-edge connection with support 50. The switch is shown in its normal position without the defrosting system in operation, and in this position terminal 52 is electrically connected to terminal 40 through contact 46 resting on contact 39 by the force of spring 53. When arm 54 is moved to the left, as viewed in FIG. 1, by means to be described, spring 53 is moved over center to the right, as viewed in FIG. 1, so that contact 46 snaps against contact 42 to electrically disconnect terminal 52 from terminal 40 and connect to terminal 44. In this position, however, the spring 53 maintains a relatively large force urging the arm 54 back to the original position shown in the drawings since the position of the spring is always at the left of the fulcrum of the arm 54. When arm 54 is moved back to its original position shown, the contact 46 is also snapped back to its original position shown in FIG. 1. Another terminal 55 is provided for reasons to be discussed hereinafter.

Again referring to FIG. 5, line voltage is directed through a wire or conductor 56 to terminal 52 of the defroster control. Another conductor 62 is provided to connect terminal 40 (FIG. 1) to a two-pole thermostat switch 58 for the freezer section which energizes compressor C when the temperature at bulb 60 rises to a predetermined value. The heater H is connected to terminal 44 by wire 64 to be energized while the compressor is turned off by the switch in the defroster control unit.

The action of the refrigerator and defroster control is as follows. When thermostat switch 58 is closed as viewed in FIG. 5, with the defroster control switch in the position shown in FIG. 1, the compressor lowers the freezer temperature in a normal manner until shut off by the thermostat. However, when the defrotser control causes arm 54 to move to the left in a manner to be described, the compressor C is turned off and heater H is energized until all the frost melts and is collected in pan 38 as described. At this time the fan F is turned off since contact 46 leaves contact 39. After all the frost is melted, the defroster control causes arm 54 and contact 46 to return to the position shown in FIG. 1, by means to be described, which restores normal refrigeration and starts fan F.

Figure 14:
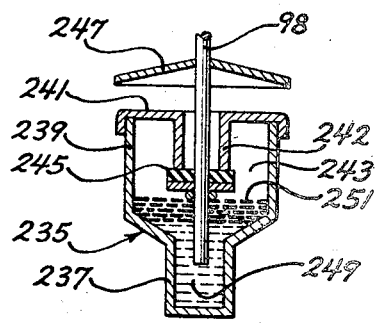
FIG. 14 is a partial sectional view of a modification of an important component of the invention.

It should be appreciated that there are many possible combinations of refrigerator arrangements and circuits. For example a refrigerator may have one or two separately closed compartments; in a two compartment unit, the freezer section may be on top or below; or the defrosting system may utilize a conventional hot-gas by-pass heating system instead of the electrical resistance unit shown herein. Also, the defroster control 10 might be mounted in many different positions on the coil 30, or away from the coil in one form of the invention (FIG. 14). The evaporator coil is frequently mounted horizontally as well as vertically; my defroster control can be adapted to operate in either vertical or horizontal positions. In addition, the defroster control device can be used for any kind of refrigerating machine, not just as a defroster control for the freezer section of a domestic refrigerator as described in connection with the principal form of the invention. Hence, the particular combination shown in FIG. 5 is merely illustrative, for controlling the frost in the freezer section 19 shown in the lower portion of a two-compartment domestic refrigerator.

Now referring to FIGS. 1–4, the means to control the termination of the defrosting action will first be explained. In the component 15, the mechanism is encased in the housing 11 of any suitable material such as molded plastic. A wall of the housing is formed by the electrical insulating base 69 for the switch, which base is inserted in slots molded in the housing and retained by the housing cover 11a in FIG. 2 but shown removed in FIG. 1. In component 15, the arm 54 carries a detent member 72 hinged thereto by a knife-edge 73 at one end to permit angular movements of the detent in relation to arm 54.

A light extension spring 74 is suitably secured at one end to the housing 11 (or to a post secured thereto) and at its other end to a portion of detent 72 urging the detent downwardly into engagement with a cam or guide member 77.

A shaft 80, which may be a molded portion of the plastic housing 11, is provided to support a latch member or arm 82 for angular movements with respect to the shaft. A very light torsion spring 84 is suitably supported by a cylindrical projection of molded housing 11 to abut latch member 82 and to urge same in a counterclockwise direction into the free position shown in FIG. 1 into abutment with stop means to be discussed. Detent 72 includes a catch portion 88 disposed to engage latch member 82 in a manner to be described.

A small vessel 96, as shown in FIG. 1, is suitably secured to a portion of the evaporator tube 30 such that the vessel is at least partly below the tubing. The vessel, which is filled with a freezable liquid such as water, may be made of any suitable material, but a metal such as aluminum is desirable to provide desired heat conductivity. The vessel is mounted to enable a sensing member 98 to be suspended from arm 85 and to extend inside an ice chamber 100 formed by the vessel. The sensing member 98 extends through an orifice or circular aperture 102 in a cover-piece 104 (preferably made of aluminum) which encloses and seals the top of vessel 96. The cover-piece includes a semi-cylindrical mounting portion 106 secured to legs 12 and 13 by suitable means, as by drive screws or pins (not shown). The cylindrical portion 106 is contoured to rest flush against the surface of evaporator tube 30 when the control device 10 is secured thereto by suitable means, as by clamps. The cover-piece 104 also includes a cup portion or trough 108 to collect melted frost for replenishing the small loss of water from vessel 100 due to evaporation, to be discussed further. The sensing member includes a sensor 110 submerged within the water of vessel 96. Sensor 110 has an ice-abutting face 112 on its lower end and a water-sealing valve portion 114 on its upper end, as viewed in FIG. 1. The valve portion is urged upwardly by spring 84 to seat against orifice 102 and seal the water in chamber 100 at all times between defrost cycles and whenever the refrigerator is not in operation. In this manner, the orifice is the "stop" for counterclockwise movements of the bellcrank comprising arms 82 and 85. Whenever the water in vessel 100 is frozen, the sensor 110 is embedded and "locked" in the ice to prevent clockwise rotation of the bellcrank.

The operation of the termination mechanism above described is as follows. Referirng to FIGS. 1–5, assume that chamber 100 of vessel 96 is completely filled with water or other freezable liquid which is frozen in normal refrigerator operation. After frost forms on the evaporato to an undesirable amount, the arm 54 is automatically moved temporarily to the left by means to be described. This action causes contact 46 to move against contact 42 which inactivates the compressor and fan but energizes the heater H adjacent evaporator 30 for melting and disposing of the frost in a manner previously described. At this time the ice or frozen liquid in vessel 96 is also subjected to heat somewhat by radiation but primarily by conduction from the heater H. Also, movement of the switch arm to its leftward position carries detent 72 leftward until spring 74 causes catch portion 88 to engage latch arm 82. The leftward actuating force on arm 54 is simultaneously removed, as will be described. Then the force of spring 53 tends to return arm 54 into the position shown with a force that easily overpowers the force of spring 84. Such forces are transmitted through detent 72 which now abuts latch arm 82 as catch portion 88 tending to impart clockwise angular movement to arm 82. However, such angular movements are prevented by the sensor 110 now abutting against the ice or frozen liquid in vessel 96 which tends to be compressed between the ice-abutting face 112 and the inside bottom wall 96a of the vessel. Thus, the ice acts as an ice or frozen-liquid "link" which grows smaller *gradually* as the ice or frozen-liquid progressively melts since contact with the melting ice is maintained by spring 53. As arm 54 with its detent member 72 *gradually* moves rightwardly when the ice in vessel 96 melts, the end of the detent member rides on cam 77 which *gradually* raises the detent member in opposition to spring 74. After a predetermined travel of arm 54 and detent 72 which is calibrated to occur when *all* the frost is melted (regardless of the location of control device 10), the catch portion 88 disengages from latch arm 82. This instantly causes two simultaneous actions as follows: The first action is that spring 84 instantly returns latch member 82 counterclockwise into the angular position shown in FIG. 1 until the valve portion 114 seats against orifice 102; accordingly the sensor 110 is moved upwardly through the path of melted ice and away from the remaining ice and restored to its original position shown. The second simultaneous action is that the high force of spring 53 causes arm 54 and detent 72 to snap into the position shown in FIG. 1, which also moves the contact 46 into the position shown against contact 39. This terminating action de-energizes heater H and starts the compressor so that refrigerator operation is again normal. The compressor is again controled only by thermostat 58, and the ice in the vessel 96 soon freezes so that the defrosting cycle can be repeated as above described.

It is important to appreciate that all the ice in vessel 96 may not melt, but only that portion adjacent the metal surfaces such as at the sensor 110 and the interior walls of vessel 96. The component 15 is so calibrated that when all the frost on the evaporator is melted, the detent member 72 is disengaged from latch arm 82 after a predetermined travel. This can be controlled by numerous variables such as the area of sensor face 112, the heat conductivity of all adjacent materials, for example, the contour (or adjustment if provided) of cam 77, etc.

It is also important to appreciate that the detent travel is always larger than (and easily includes) the travel necessary to cause contact point 46 to "snap" between contacts 39 and 42. Hence the production setting of the switch "snap" is not in the least critical as in many prior devices; because for production units it is only necessary to provide the relatively large travel of detent 72.

When the refrigerator is first placed in service and water is to be the liquid in the vessel, the present invention provides improved means to preclude the necessity of filling the vessel when starting the refrigerator, because the vessel is filled and sealed by valve 114 when the device is manufactured.

The sensor 110 is illustrated as a straight cylinder having a spherical or tapered valve portion 114 on top. This shape is desirable to render the sensor substantially independent of ice resistance except on the face 112. Vessel 96 includes a reduced portion 96c, and sensor 110 abuts ice only in this reduced portion. The vessel includes an upper enlarged portion 96e which in effect is a "reservoir" for the water in portion 96c. The advantage of this construction is that the vessel can be filled with water when the defroster control is manufactured, and the valve 114 precludes outside air from the water so that the water never evaporates, even if the refrigerator stands two or three years before it is used. If valve 114 leaks slightly, the calibration of the defrost period would be unchanged even if a small amount of water evaporates from the vessel-portion 96e. In this manner, sufficient water is retained in the vessel to insure defroster operation, even if the refrigerator is stored in hot dry climates for years before usage. In operation, when valve 114 is open for the periodic but short defroster period, a slight amount of water evaporates; but this slight evaporation is always replenished by the melted frost collected in trough 108. This evaporation is so slight that even a small amount of frost forming over a long period of time, such as two weeks for example, is sufficient.

Hence, the principle of the duration control unit 15 as above described is an improvement over the duration control disclosed in my Patent No. 2,949,016 although at a slight increase in cost. The inherent simplicity, reliability, consistency, function accuracy, and potentially low cost of the duration control disclosed herein provides an inventive combination with the initiating means now to be described.

Now consider the means 14 to initiate operation of the duration control device, which in the specific duration device disclosed herein, comprises the means to effect periodic or occasional intermittent movements of the arm 54 after a predetermined amount of frost has formed. Referring to FIG. 2, the arm 54 is disposed to be actuated occasionally by an actuator or power output member 116 supported by a pair of shafts 118 and 120. The shafts are suitably secured to (or are a part of) the housing 11 projecting through slots 116a and 116c which enable movements of the actuator. The actuator 116 includes a cam-portion 117 for purposes to be described.

An actuator latch 122 is connected to actuator 116 by suitable hinge means and is urged in a counterclockwise direction by a U-spring 123 having one end thereof secured to the actuator and its other end secured to latch 122. The latch includes a cam extension 124 at the left face 122a thereof (FIG. 2), which face is adapted to abut switch arm 54 to enable a lost-motion action, all as shown in FIG. 1. The cam extension 124 cooperates with a cam pin 125 to release arm 54 in a manner to be discussed.

The force-amplifying mechanism illustrated in FIGS. 1–4a will now be explained. A ratchet wheel 126 having ratchet teeth 128 is rotated slowly on shaft 120, such as once every three hours for example, by the input power means to be described.

The initiating mechanism includes integrating means to provide a relatively large actuating force by actuator 116. This force is produced by a force-amplifying mechanism interposed between the actuator 116 and a force-input power means or element, and is disposed to reduce substantially the force and energy required of the force-input power means as well as reducing its size and travel. Broadly this reduction in the size of the input power element and the energy required therefor is to provide such a force-amplifying mechanism which integrates and stores the small energy over an extended period of time; and means are provided to release this stored energy at the end of this time period to provide a substantially larger actuating force by actuator 116 than possible without the integrating mechanism. Also, the travel of the actuator 116 is much larger than the travel of the input means.

A detent 132 which includes a catch 132a and a tab 133 is connected to and carried by the wheel 126 for rotation therewith. The detent 132 is prebent slightly so that its hinge pin 134 applies slight friction force to maintain the detent in any set angular position. A pinion-piece 136 rotates freely on shaft 120 and includes an arm 138 which is adapted to abut the catch 132a. The actuator 116 is supported and guided by shafts 118 and 120 for axial sliding movements as explained; the actuator includes a rack portion 140 cooperating with pinion 136 for operation thereby. A power spring 142 urges the assembly to the left from a "charged" position (as shown in FIG. 1) just prior to "firing." One end of spring 142 is connected to a tab extension 116b of power member 116 and the other end is connected to a pin 144 secured to or a part of housing 111. The detent 132 includes a tab 133 disposed to be abutted by the cam-portion 117 of the actuator 116. The teeth of pinion 136 engage the teeth provided in rack-portion 140 of the power-member 116.

For clarity, the size of the gear portion of pinion-piece 136 as shown in FIG. 1 is larger and out of proportion in relation to wheel 126 and rack portion 140. FIG. 3 shows the gear portion in correct size relationship with the rest of the mechanism.

In operation, briefly, clockwise rotation of ratchet wheel 126 causes the power member 116 to creep rightwardly for slowly storing energy in power spring 142. This energy is released by detent 132 once every two to four hours, for example, for enabling actuator 116 to snap to the left for initiating the duration control mechanism as described above, at which time the actuator is disconnected from the control means. Subsequent rotation of ratchet wheel 126 returns the entire assembly to the position shown to repeat the cycle. More specifically, this action is accomplished as follows: Starting from the positions shown when wheel 126 rotates slowly, the catch 132a of detent 132 engages arm 138 to rotate pinion 136 acting on rack-portion 140 to move the power member 116 to the right so that spring 142 is slowly extended to store energy acting on the actuator. When the ratchet-wheel has revolved nearly one turn, the cam portion 117 abuts tab 133 which releases catch 132a from arm 138, so that the stored energy of spring 142 now snaps actuator 116 to the left to operate the defroster sensing mechanism as required. When cam-extension 124 reaches the position 122a, it rides up on pin 125 to release arm 54. At this time spring 53 causes detent catch-portion 88 to abut latch member 82 and initiate the defrost action as above described. When the wheel 126 again starts to rotate upon termination of a defrosting period, the cycle is repeated. Since detent 132 is now positioned clear of arm 138, the pinion-piece and its arm is rotated rapidly one complete turn counterclockwise after the power member is returned by spring 142 to the position shown.

Means are provided to produce the small input power force or energy required to operate the foregoing mechanism. In the form of the invention illustrated in FIGS. 1–4, such input-power means comprises a heat-sensitive element which alternately is heated and cooled under control of a switch operated by the element itself to alternate the application of the heat energy. Referring to FIGS. 2–4, the thermal element illustrated therein comprises a bimetal leaf or strip cantilever member 150 suitably secured at one end to housing 11. The bimetal includes a U-shaped end portion 151. An electric-switch contact 152 is carried by the bimetal to alternately engage another contact 154 carried by a knife-edge arm or blade 156 disposed for arcuate movements within the U-portion 151. The contact 152 is insulated from the bimetal by suitable non-conducting material wherein the bimetal is electrically inert. An electric heating element or heater 158 is connected between terminals 40 and 55 and is controlled by contacts 152 and 154. The heating element 158 is either wound around bimetal 150 or otherwise mounted adjacent thereto. A bowed U-shaped leaf member 160 has one end projecting through an aperture at an intersecting point 162 in blade 156 and the other end in a V-slot 161 molded in housing 11 to urge the knife end of blade 156 against another V-slot 163 in housing 11. The force of leaf member 160 causes blade 156 to snap either up or down as the intersecting point 162 passes above or below, respectively, a straight line between the two V-slots in housing 11. In this manner, contacts 152 and 154 are snapped apart or together as shown. When the bimetal 150 is heated after about one or two minutes, for example, it moves upwardly enough to snap contact 154 away from contact 152 against a plastic stop 164 secured to U-portion 151, thereby de-energizing the heater 158. The bimetal now cools and warps downwardly for about one or two minutes until contact 154 passes the mid-position of intersection point 162 to snap the contacts together and re-energize heater 158. In this manner, the heating and cooling cycle is continuous while the compressor is in operation as illustrated in FIG. 1, to be discussed further.

This particular "flasher-type" self-controlling switch has utility, per se, especially when provided as a part of a bimetal timer for any use. This unique construction enables design-selection of the time for the heating portion of the cycle and also the time for the cooling portion of the total time-cycle. This is accomplished by (1) varying the distance between contact 152 and the stop 164 and (2) the initial angular position of bimetal 150 in relation to the line between the two V-slots 161 and 163. An increase in the distance between contact 152 and stop 154 increases the time of the overall cycle, and conversely. If the bimetal is initially positioned so that contact 152 is closer to the line between slots 161 and 162 than stop 163, the heating time tends to be less than the cooling time, and conversely. This general principle is modified somewhat by other factors such as the rate of heating of the various elements compared to the rate of cooling thereof, but this unique construction enables design control separately of the heating and cooling periods.

A ratchet arm, such as leaf element 166, is secured to bimetal 150 and is insulated by suitable means to be electrically inert. The ratchet arm includes a hook (not seen) to engage the teeth 128 of wheel 126 so that each downward movement of bimetal 150 moves wheel 126 one tooth-length in a clockwise direction; reverse movements are prevented by a pawl 170. With 60 teeth in wheel 126, for example, and a bimetal time cycle of 3 minutes, the wheel will rotate one turn in 180 minutes or three hours. Hence, the defroster control "fires" once every three hours of compressor operation if a spring 172 is held in by screw 174. The spring 172 is prebent outwardly toward housing 11 but may be set in any position by screw 174 to apply a slight force on detent 132 so it returns to the position shown after each release of arm 138. With this arrangement the defroster cycle is initiated once per revolution of wheel 126.

Another very useful mode of operation can be produced if the screw 174 is withdrawn so that spring 172 does not contact detent 132. With this arrangement, when the wheel 126 rotates upon termination of a defrost cycle (refrigerator fan and compressor starts), the detent 132 remains in its outward position because of friction and does not actuate arm 138, so that no energy is stored in the spring 142 during the first revolution of wheel 126. When the detent 132 passes cam 146 during the first revolution of wheel 126, it is moved radially inwardly to the position shown and is held there by friction since the detent is prebent initially a slight amount to provide such friction after assembly. During the second revolution of wheel 126, arm 138 is actuated to slowly store energy in the power spring as described previously. After the second revolution of wheel 126 is completed, all parts are in the position shown, and the entire cycle is repeated as above described. Thus, in this example, if the first revolution (under no-load) requires two hours and the second revolution (under load) requires three hours, the actuator "fires" once every five hours.

Hence, the screw 174 could comprise a service adjustment in the field. Normally, the screw would be set as shown in FIG. 1, but in very dry climates such as at Tucson, Ariz., the screw 174 can be withdrawn to increase the time interval between defrost periods, since the rate of frost formation is very low in such climates.

This construction illustrates how means can be provided to effect initiation of the defrosting mechanism *each time* the actuator 116 "fires" solely upon predetermined time intervals. The arm 54 is abutted by the end face 122a each time the actuator 116 is operated. The actuator and its latch 122 with abutting face 122a in FIG. 1 comprise a "lost-motion" means, and any other equivalent lost-motion mechanism may be employed. The integrating mechanism and its reciprocating power means, such as the bimetal and associated elements 126, 128, 150, 156, 158, 160, 166, 170, etc. actually comprise a "thermal clock" or timer mechanism. The various constants are selected such that the actuator 116 will fire once about every two to four hours, for example, or as required by each refrigerator manufacturer. These constants might comprise the size of wheel 126, the number of ratchet teeth 128, the size of the bimetal element 150, the size and type of heater wire 158, etc.

While the bimetal-operated timer means described above has utility, per se, actual tests have proven that the principle of the ice-abutment termination means disclosed herein is so actuater, that it actually controls the duration of the defrost heating period irrespective of the initial thickness of frost; also, since this ice-abutment principle depends on the melting temperature and heat of fusion of ice which is absolutely consistent in all production units, the variation in production units is very small. Hence, these two important factors enable the practical utilization of the novel bimetal "clock" mechanism as the sole initiating means which is desirable because of its small size, inherent reliability, noise-free operation, low cost and inherent simplicity. Hence, the combination of the novel ice abutment termination (duration) mechanism with the bimetal "clock" or timer mechanism disclosed herein has great utility.

The bimetal operated timer mechanism is not an accurate time-measuring device because of the many variables. However, the inherent accuracy and consistency of the ice-abutment duration (termination) system enables this inaccurate but very low-cost timing mechanism to be acceptable, and provides an extremely small and simple complete automatic defroster control device.

In all forms of the present invention, the defroster control is arranged to start with a small force and store it over a period of time for sudden release to provide the large force and travel needed to operate the switch. In my device, since the forces operating the bimetal can be so low in relation to the capacity of the respective parts, they will give lifetime operation in production units and hence great reliability.

It has been explained how the control of detent 132 by spring 172 and screw 174 enables a choice in determining the time cycle. Another selective method for affecting the time cycle, as illustrated in FIG. 1, comprises a manually selectable switch 178 connected to heater 158. The switch connects the heater element either to terminal 40, as illustrated, or to terminal 52. If the heater is connected to terminal 40, the timer mechanism is operated only during operation of the compressor, and hence initiates defrost only after a predetermined time of compressor operation. When the switch is set (shown dotted) to connect heater 158 to terminal 52, the timer mechanism operates at all times. The switch 178 can be installed remotely for operation in field service; in normal operation, the switch is set as shown, but in very humid areas the screw 174 is set as shown in FIG. 1 and the switch connects heater 158 to terminal 52 to provide the shortest time interval between defrost periods. Of course, any of these four selectable settings can be made permanent by connecting the heater either to terminal 40 or terminal 52; also spring 172 and screw 174 can be omitted, or spring 172 alone can be employed always bearing against detent 132 if desired.

The time of the bimetal cycle can be varied by other suitable means such as by an adjustable rheostat (not shown) in series with heater 158 to selectively vary the current therethrough.

The form of the invention shown in FIG. 6 is a modification of the form shown in FIG. 1 in only two ways. Referring to FIG. 6, modified means for storing energy in spring 142 comprises a cam 182 which is connected to or is a part of the ratchet wheel 126 for rotation therewith when bimetal 150 reciprocates upon heating and cooling thereof, all as described above. An actuator 184 is shaped differently from actuator 116 of FIG. 1, but otherwise operates in the same manner. Actuator 184 includes a cam follower tab 186 which projects over the cam surface for moving actuator 184 rightwardly upon rotation of wheel 126 counterclockwise, all in a manner described above. When the energy is stored in spring 142, a step 188 of cam 182 passes by tab 186 to release actuator 184 which initiates the defrosting action in the same manner as for FIG. 1.

In the second modification in FIG. 6, an open vessel 190 is mounted adjacent coil 30 in the flow path of melted frost. The latch member 82 includes a sensing portion 192 projecting within the vessel to abut ice between it and the left wall 190a of the vessel during the defrosting periods. A semi-cylindrical starter member 194 is loosely connected to sensor 192 with universal movement for enabling the starter to slide on tube 30. When the refrigerator is first placed in service with no water in vessel 190, the starter 194 is restrained by resistance of frost on tube 30. The melted frost gradually fills vessel 190 in subsequent defrost cycles, and the vessel is maintained full in this manner thereafter. A more complete discussion of this from of ice sensor is presented in my copending application Ser. No. 373,762. Tests have shown that if the defroster control unit is mounted at a point on coil 30 where the last portion of frost melts, vessel 190 can be omitted. However, if the vessel is employed, the defroster control can be mounted anywhere on coil 30 and calibrated to terminate when the last portion of ice melts although remote from the vessel.

FIGS. 7 and 8 show another modification of the form of the invention shown in FIG. 1, in which modified means are provided to charge spring 142. In FIGS. 7 and 8, another actuator 196 includes a rack-portion 198 cooperating with pinion 200 having a few teeth missing. When wheel 126 is rotated slowly counterclockwise by bimetal 150, the actuator 196 is moved to the right to charge spring 142. When pinion tooth 200a (FIG. 8) leaves the rack teeth, the actuator 196 is released to initiate the defrost action in a manner previously described. Subsequent rotation of pinion 200 enables the pinion-tooth 200c to engage or "pick-up" rack-portion (which then is positioned at the left as viewed in FIG. 7) and again cause the slow rightward charging movement of actuator 196. For clarity, the gear portion of pinion 200 as shown in FIGS. 7 and 8 is shown larger and out of proportion in relation to wheel 126 and rack-portion 198.

In the forms of the invention shown in FIGS. 1, 6 and 7, the actuator slowly moves away from switch arm 54 to store energy in spring 142; and when the actuator is released, the stored energy actuates the switch arm to initiate the defrost cycle. At that time, latch 122 is released from arm 54 for enabling the sensors 110 or 192 to abut ice, and the cycle is then repeated.

Figure 10:
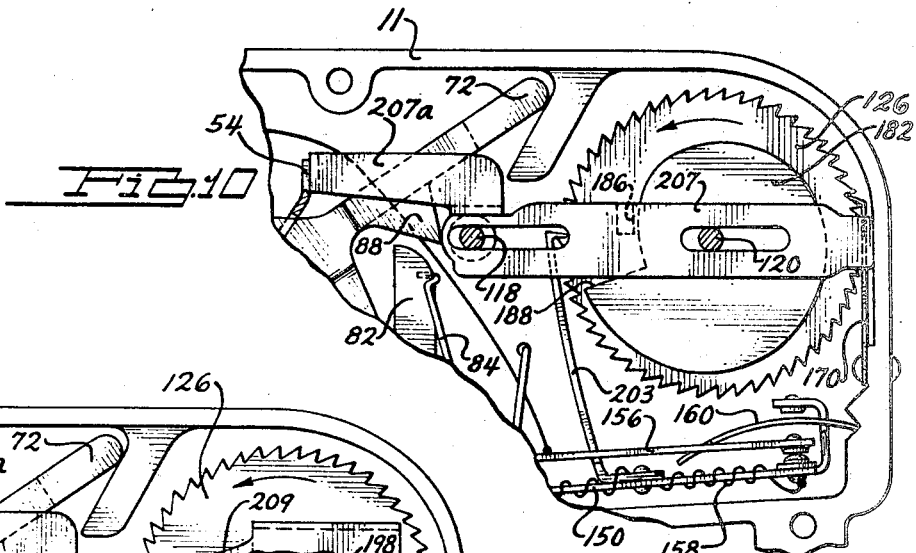
Figure 11:
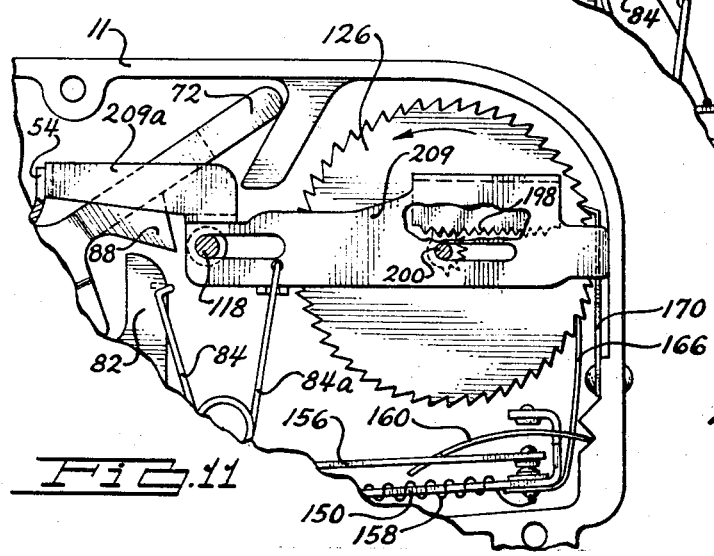

FIGS. 9, 10 and 11 show reversals of the forms shown in FIGS. 1, 6 and 7, respectively. For example, in FIG. 9 the detent 132 and its tab 133, pinion-piece 136 and its arm 138, rack portion 140 and cam portion 117 are all reversed from that shown in FIG. 1 to rotate wheel 126 counterclockwise. Also, a ratchet-actuating arm 203 is illustrated connected to blade 156, instead of using arm 166 in FIG. 1, although either may be used in any form of the invention. In FIG. 9, only as an alternate bimetal switch arrangement, the actuating arm 203 is operated by the force of spring 160 acting on blade 156 instead of direct actuation by the bimetal element 150 as shown in FIG. 1. In operation of the form shown in FIG. 9, when ratchet wheel 126 slowly rotates counterclockwise as a result of heating and cooling of bimetal 150, the actuator 205 and an abutting portion 205a thereof abuts and moves the switch arm slowly to the left. This action continues until (1) the catch 88 of detent 72 drops into engaging position in relation to latch member 82, and (2) upon continued rotation of wheel 126, the switch blade 48 snaps contact 46 to the right for initiating the defrosting action by energizing heater H.

The wheel 126 must continue to rotate until cam 117 abuts tab 133 to release the actuator 205 which is returned to the position shown in FIG. 9 by an arm 84a of spring 84. Actually arm 84a can be deleted since spring 53 eventually returns the parts to the position shown in FIG. 9 wherein the cycle can be repeated.

It is apparent that it is desirable to release the actuator as soon as possible after blade 48 starts heater H. Therefore, the heating element 158 must be conected to terminal 52 for enabling the necessary continuous operation of wheel 126, thereby precluding "measuring" the time of compressor operation.

The form of the invention shown in FIG. 10 operates in the same manner as does the form shown in FIG. 9, except that the means to cause leftward movement of actuator 207 is the same as that disclosed in FIG. 6 but in a reverse direction. Referring to FIG. 10, the cam 182 is revolved by bimetal element 150, as before, to act on tab 186 of actuator 207 to move the actuator and its abutting portion 207a slowly to the left until step 188 passes tab 186 to release actuator 207. The operation of the form shown in FIG. 10 is otherwise the same as with the form shown in FIG. 9. However, an alternate modification of the bimetal actuator arm 203, which can be used in any form of the invention, is illustrated in FIG. 10. In this modification, the arm 203 is secured to bimetal 150 at a point partway of its length. In this arrangement, the travel of the arm 203 is less but provides an increased force.

The form of the invention shown in FIG. 11 operates in the same manner as does the forms shown in FIGS. 9 and 10, except that the means to cause leftward movement of actuator 209 is the same as that disclosed in FIG. 7, and the actuator moves in a reverse direction. Referring to FIG. 11, the pinion 200 is revolved by bimetal element 150, as before, to act on rack-portion 198 to move the actuator 209 and its abutting portion 209a slowly to the left until the last tooth 200a (FIG. 8) leaves the rack-portion 198 for releasing actuator 209. The operation of the form shown in FIG. 11 is otherwise the same as with the forms shown in FIGS. 9 and 10.

While the forms of the invention shown in FIGS. 9, 10 and 11 are simpler than the forms shown in FIGS. 1, 6 and 7, each of the latter forms actuates the switch and engages the catch 88 with latch 82, and also releases the actuator from the switch arm in an instantaneous sweeping movement by the energy of spring 142. Hence, in the forms of the invention shown in FIGS. 1, 6 and 7 the production control thereof is easier, and also these forms can be set to defrost only after a predetermined time of compressor operation. However, a higher bimetal force is necessary to overpower spring 142 which is not required in the forms of FIGS. 9, 10 and 11 since spring 142 is omitted. Hence, it is my present belief that the forms of the invention of FIGS. 9, 10 and 11 will be used in the very low cost domestic refrigerators and air conditioning units. The forms shown in FIGS. 1, 6 and 7 will find use in medium priced refrigerators and air conditioners and some commercial applications; and the direct thickness measuring defroster control of my copending application, Ser. No. 373,762 will find use in expensive domestic refrigerators and air conditioning units as well as for commercial applications.

Figure 13:
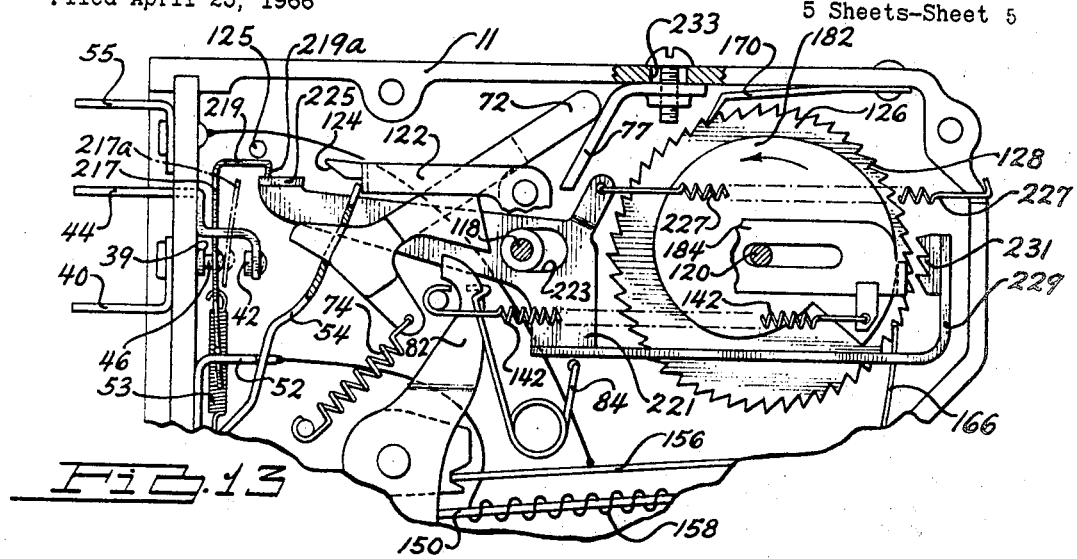
FIGS. 12 and 13 are enlarged fragmentary elevational views of modified forms of the invention providing means to delay refrigeration after a defrost cycle.
Figure 12:
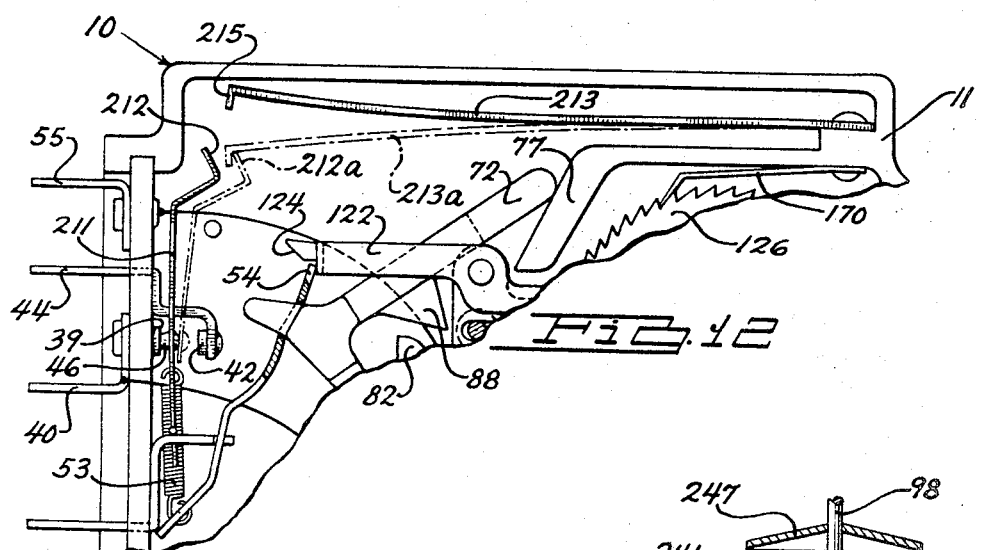

FIGS. 12 and 13 disclose modifications of any of the prior forms of the invention, which modifications include novel means for delaying the compressor (and/or fan) operation after termination of the defroster cycle. In the form shown in FIG. 12, the switch blade 211 differs from blade 48 because of extension 212 which extends to the side terminal-piece 44. The contact 42 is spaced further from contact 39 than in prior forms of the invention to provide increased travel, such as 50–75% more, for example. A bimetal restrainer 213 is suitably secured to housing 11, as by riveting, and includes a catch portion 215 disposed to restrain extension 212 in the following manner: the bimetal 213 is shown in the cold position during normal refrigeration when the temperature surrounding the defroster control 10 might be −15 degrees F., for example. When the latch 122 is caused to actuate arm 54, contact 46 snaps from contact 39 to contact 42 to start the defrost heater H and stop the compressor and fan. When all the frost has melted, the ambient temperature is about 55 to 65 degrees F. This high temperature causes the bimetal 213 to warp downwardly (FIG. 12) to the position 213a, shown dotted. When the defrosting cycle is terminated, the detent 72 and arm 54 are released from latch member 82 so that blade 211 snaps to the left to the position 212a. However, the catch portion 215 of bimetal 213 stops blade extension 212 in a position to maintain contact 46 about half-way between contacts 39 and 42. At this time, the heater H is off, and compressor C is not started. When the ambient temperature cools to about 25-30° F., for example, bimetal 213 warps upwardly enough to release the end of extension 212, and contact 46 then snaps to contact 39 to start the compressor and fan. The catch 215 can be made of plastic and secured to the bimetal to make it inert electrically. A delay mechanism is desired by some refrigerator manufacturers to enable the refrigerant to cool down before starting the compressor.

The modification shown in FIG. 13 provides a delay of the switch action in the same manner as in FIG. 12, except the delay is based on time instead of temperature. In FIG. 13, a switch blade 217 includes an extension 219 with a catch portion 219a arranged so that the extension is behind terminal portion 44. A restrainer member 221 includes a slot 223 cooperating with the boss of shaft 118 to provide a hinge for enabling slight angular and longitudinal movements of the restrainer 221. The restrainer includes a latch portion 225 adapted to cooperate with extension 219. A spring 227 has one end connected to the housing and provides a very light force (such as one-half ounce) to urge restrainer 221 in both a rightward movement and a slight clockwise movement. Spring 227 is always overpowered by spring 53 which provides a force acting on extension 219 of about 6 ounces, for example. The restrainer includes a lock-portion 229 including teeth 231 disposed to engage the teeth 128 of wheel 126. The heater element 158 must be connected to terminal 52 so that the wheel 126 rotates at all times in the modification of FIG. 13.

In operation, when arm 54 is moved to the left to initiate the defrost action, contact 46 snaps to contact 42 which is spaced further from contact 39 as in the form of FIG. 12, thereby energizing heater H. At this time the blade extension catch 219a passes over the end of latch portion 225. When detent 72 is released from latch member 82 at the end of the defrost cycle, the switch blade 217 snaps to the left when arm 54 snaps to the right. This action causes blade extension 219 to abut latch portion 225 and move restrainer member 221 to the left, as viewed in FIG. 13. This movement is terminated when the teeth 231 engage the teeth 128 of wheel 126; at this time the contact 46 is held in a position about half-way between contacts 39 and 42 so that the heater H, the compressor and the fan are all off. As the wheel 126 is rotated, the restrainer is revolved counterclockwise about shaft 118. After about 6 to 10 minutes of such angular rotation, extension 219 is released from latch portion 225 so that the contact 46 snaps to contact 39 to start the compressor and fan. In this manner, the desired delay of refrigeration is provided as a function of time.

In the delay mechanism of FIG. 12, the heater 158 can be connected to terminal 40 as shown, because the wheel 126 can be stopped during the defrost cycle since the delay is a function of temperature. Hence, in the delay mechanism of FIG. 12, the timer mechanism can operate either only during compressor operation or all the time.

It is important to appreciate that, while the particular switch mechanism disclosed in FIGS. 12 and 13 has great utility, other switch arrangements can be operated by the temperature or time responsive means disclosed in FIGS. 12 and 13, respectively. For example, it is possible to provide two separate switch blades with separate sets of contacts having normal travel; the delay mechanism then can hold one of the switch blades from complete movement whereas both switches must be closed to start the compressor. However, the switch disclosed herein is simpler and smaller.

Another modification shown in FIG. 13 is the provision of a separate cam 77 adjustable by suitable fastening means, as by a screw, movable in a slot 233. This adjustment varies the release point of detent 72 in relation to latch member 82. Other adjustments may be provided, for example, to vary the length of sensor 98, the angular relation of arms 82 and 85, etc.

FIG. 14 shows an alternate vessel 235 which enables mounting the defroster control 10 at a point other than on coil 30. The vessel includes a lower portion 237 of small size and an upper portion 239 of large size. A cover 241 includes a cylindrical or rectangular portion 242 extending into the vessel to enclose same and form a toroidal round or rectangular upper chamber 243. A synthetic rubber valve 245 is carried by sensing member 98 to seal the end of cylindrical portion 242 in the same manner as valve 114 in FIG. 1. A shield 247 is secured to the sensing member to prevent condensation or melted frost from entering the vessel. The lower portion of the vessel is filled with water 249 at the factory, and a layer of non-evaporating liquid 251, such as mineral oil, rests on top of the water to "seal" the water from evaporation. When the defroster control is shipped to the refrigerator manufacturer, the liquids cannot escape, firstly because of valve 245 and secondly, because of the non-spill vessel design. Thus the liquid cannot leak out in any attitude of the vessel, even if valve 245 were omitted, because the volume in the upper chamber 243 is much greater than the volume of liquids. Hence, the defroster control with the vessel 235 can be mounted anywhere in the refrigerator providing it is subjected to at least a portion of the heat of heater H. For this purpose, I have also successfully tested vessels filled entirely with non-evaporating freezable liquids, such as wax-like paraffin compounds. However, at the present time the sudden change of state of water upon freezing appears to be most desirable because water is affected by heat in the same manner as frozen foods, most of which comprise about 90 percent water.

What I claim is:

1. In a defroster control device for a refrigerating machine having a cooling unit subject to the formation of frost thereon and including normally inactive defrosting means to effect a melting of said frost, the combination comprising; control means to activate intermittently said defrosting means for melting said frost, means to terminate said defrosting means when substantially all said frost is melted, said terminating means including a vessel containing a body of frozen liquid fixed in relation to said machine, said terminating means also including sensing means having a portion disposed within said vessel and adapted to operatively engage said body of frozen liquid, initiating means adapted to operate said control means for effecting said activation thereof and to cause operative connection of said control means and said sensing means after frost has formed on said cooling unit to effect operation of said terminating means, force-producing means adapted to act on said sensing means when said connection is effected to cause said sensing portion to abut against said frozen liquid tending to compress same against a wall of said vessel and to cause said sensing portion to move gradually with said frozen liquid a predetermined distance upon progressive melting of said frozen liquid to effect said termination of said defrosting means, said body of frozen liquid then acting as a thermally-varying frozen-liquid link between said sensing portion and said wall, said vessel including an aperture, and valve means operatively associated with said sensing means automatically to close said aperture whenever said defrosting means is inactive, and to open said aperture whenever said defrosting means is active.

2. The combination of means defined in claim 1, and said sensing means portion being disposed to project through said aperture into said liquid in said vessel, said valve means including a movable valve member operatively connected to said sensing means for cooperating with said aperture to provide said closing action.

3. In a control device for apparatus having a surface subject to the formation of frost adjacent thereto, the combination of; control means including means effecting a melting of said formation of said frost, a vessel of ice subjectable to said melting means, a sensing member having a portion disposed within said vessel and normally disconnected from said control means, initiating means adapted to actuate said control means for initiating a melting action of said frost and to cause operative connection of said control means and said sensing member, means to cause said then-connected sensing member to abut against said ice in said vessel tending to compress the ice between said member and a wall of said vessel and gradually move with said ice as it progressively melts to effect a termination of said melting action, and valve means operatively associated with said sensing means and said vessel to maintain said vessel closed when said melting means is inactive.

4. In a control device associated with a refrigeration machine having a surface subject to the formation of frost thereon and heating means to melt the frost, the combination of; means to control said heating means for periodic melting of said frost forming on said surface, actuating means adapted to cause operation of said control means for initiating a melting of said frost, a vessel of ice fixed in relation to said machine and mounted in the flow path of melted frost, a termination sensing member having a portion disposed within said vessel and embedded in the ice therein and disconnected from said control means during normal operation of said machine, means to operatively connect said control means to said sensing member upon said initiation of said melting action, biasing means acting on said control means when said connection is effected to cause said then-connected sensing member to abut against the ice in said vessel tending to compress same between said sensing member and a wall of said vessel and to move with said ice as it progressively melts to form a thermally-varying frozen-liquid link between said sensing member and said wall to sustain said defrosting action, means to effect a disengagement of said operative connection after a predetermined travel of said sensing member during said last-named movement, said biasing means then returning said control means to its original position corresponding to said normal operation of said machine for terminating said defrosting action, means to return said sensing member upon said disengagement to its original position, and valve means operatively associated with said sensing means and said vessel to maintain said vessel closed when said heating means is inactive, and to open said vessel when said heating means is active for enabling said melted frost to replace water evaporated from said vessel during said defrosting period.

5. In a control device for refrigeration apparatus having a surface subject to the formation of frost thereon, and means to effect a melting of the frost, the combination of; control means adapted to operate said melting means to eliminate said formation of said frost, a vessel of ice subjectable to said melting means, a sensing member having a portion disposed within said vessel and normally disconnected from said control means initiating means to actuate said control means and to cause operative connection of said control means and said sensing member substantially upon initiating said melting action of said frost, force-producing means to cause said then-connected sensing member to abut against said ice in said vessel tending to compress the ice between said member and a wall of said vessel and gradually move with said ice as it progressively melts, valve means operatively associated with said sensing means and said vessel to automatically maintain said vessel closed while said melting means is inactive, and means to effect a disengagement of said connection after said ice has melted a predetermined amount for terminating said ice-melting action.

6. In a control device for apparatus having a surface subject to the formation of frost adjacent thereto, the combination of; control means including means effecting a melting of said formation of said frost, a vessel of ice subjectable to said melting means, a sensing member having a portion disposed within said vessel and normally disconnected from said control means, means adapted to actuate said control means for initiating a melting action of said frost and to cause operative connection of said control means and said sensing member substantially upon said initiation of said melting action, means to cause said then-connected sensing member to abut against said ice in said vessel tending to compress the ice between said member and a wall of said vessel and gradually move with said ice as it progressively melts to effect a termination of said melting action, and a layer of non-evaporating liquid lighter than water resting on top of said ice within said vessel to seal the ice for preventing evaporation thereof.

7. In a defroster control device for a refrigerating machine having a cooling unit subject to the formation of frost thereon and including normally inactive means to effect a melting of said frost, the combination comprising control means to activate intermittently said means for melting said frost, means to inactivate said melting means after substantially all said frost is melted, said inactivating means including a vessel containing a body of frozen liquid fixed in relation to said machine, said inactivating means also including sensing means having a portion disposed within said vessel and adapted to operatively engage said body of frozen liquid, force-producing means to cause said sensing portion to abut against said frozen liquid tending to compress same against a wall of said vessel and to cause said sensing portion to move gradually with said frozen liquid a predetermined distance upon progressive melting of said frozen liquid to effect said inactivation of said melting means, valve means operatively associated with said sensing means and said vessel to maintain said vessel closed when said defrosting means is inactive, and a layer of non-evaporating liquid on top of said frozen liquid within said vessel to seal the frozen liquid for preventing evaporation thereof when melted.

8. In a defroster control device for a refrigerating machine having a cooling unit subject to the formation of frost thereon and including normally inactive means to effect a melting of said frost, the combination comprising control means to activate intermittently said means for melting said frost, means operable in relation to said control means to inactivate said melting means after substantially all said frost is melted, said inactivating means including a vessel containing a body of frozen liquid fixed in relation to said machine, said inactivating means also including sensing means having a portion disposed within said vessel and adapted to operatively engage said body of frozen liquid, force-producing means to cause said sensing portion to abut against said frozen liquid tending to compress same against a wall of said vessel and to cause said sening portion to move gradually with said frozen liquid a predetermined distance upon progressive melting of said frozen liquid to effect inactivation of said melting means, said vessel having a lower chamber to contain most of said frozen-liquid, said vessel having a cover including a projection surrounding said sensing portion and extending partially within said vessel to comprise an inner wall forming a relatively large upper chamber around the perimeter of said inner wall and normally displaced by air, the volume of said upper chamber being disposed to contain said melted frozen-liquid in any attitude and position of said vessel without spilling any of said melted frozen-liquid.

9. In a control device for a refrigeration machine subject to the formation of frost on a surface thereof, said refrigeration machine including defrost heating means, the combination of; control means to cause operation of said heating means for regulating the quantity of said frost forming on said surface, initiating means operatively associated with said control means to cause operation thereof for starting the melting of said frost after forming on said surface, means to control the duration of said frost melting period, said initiating means including actuator means movable in relation to said control means while operatively disconnected therefrom, spring means acting on said actuator means and adapted to be charged with energy by said movement of said actuator means to store energy therein, power means operatively associated with said actuator means to cause said energy storing movement of said actuator means, latch means operatively associated with said actuator means for enabling same to be operatively disconnected from said control means during said charging movement of said actuator means, said latch means including means adapted to operatively connect said control means and said actuator means before said charging movement thereof is completed, release means operated incident to said movement of said actuator means after a predetermined travel thereof to release same for enabling the stored energy of said spring means to cause said actuator means to operate said control means for activating said defrost heating means, and means operatively associated with said latch means for causing same to operatively disconnect said actuator means and said control means after the same has been activated for enabling said control means to be regulated by said duration control means until said frost melts, and the cycle is repeated.

10. The combination of means defined in claim 9, and an electric circuit for said refrigeration machine, and said power means including a bimetal element adapted to cause said movements of said actuator means, electric heating means connected in said electric circuit and mounted near said element to provide a small amount of energy for intermittent heating of said bimetal element for causing reciprocating movement thereof to effect said operation of said actuator means, switch means in said circuit operated by said element for controlling said electric heating means to provide said intermittent heating and cooling thereof for effecting said reciprocating movements of said element.

11. The combination of means defined in claim 9, and said means to control the duration of said frost-melting said including termination sensing means contacting some ice subjectable to said heating means, force-producing means activated by said initiating means upon starting said melting action and disposed to act on said termination sensing means for causing same to abut against said last-named ice and gradually to move therewith as said ice progressively melts until said frost-melting action is terminated.

12. In a control device for a refrigeration machine subject to the formation of frost on a surface thereof, said refrigeration machine including defrost heating means, the combination of; control means to cause operation of said heating means for regulating the quantity of said frost forming on said surface, initiating means operatively associated with said control means to cause operation thereof for starting the melting of said frost after forming on said surface, means to control the duration of said frost melting period, said initiating means including actuator means movable in one direction in relation to said control means while operatively disconnected therefrom, spring means acting on said actuator means and adapted to be charged with energy by slow movement of said actuator means in said first-named direction to store energy therein, timer means operatively associated with said actuator means to cause said energy storing movements thereof, latch means operatively associated with said actuator means for enabling same to be operatively disconnected from said control means during said charging movement of said actuator means, said latch means including means adapted to operatively connect said control means and said actuator means before said charging movement thereof is completed, release means operated after a predetermined movement of said actuator means corresponding to a predetermined time interval to release same for enabling the stored energy of said spring means to cause said actuator means to move rapidly in a direction opposite from said first-named direction for operating said control means and initiating said defrost heating means, and means operatively associated with said latch means to cause said actuator means to be operatively disconnected from said control means after the same has been activated for enabling said control means to be regulated by said duration control means until said frost melts, and the cycle is repeated.

13. In a mechanism to cause movement of an operated member, the combination of; actuator means movable in relation to said operated member while operatively disconnected therefrom, energy-storing biasing means acting on said actuator means and adapted to be charged with energy by said movement of said actuator means, power means operatively associated with said actuator means to cause said energy-storing movements thereof, latch means operatively associated with said actuator means and said operated member and operatively disconnected therefrom during said charging movement of said actuator means, said latch means including means adapted to operatively connect said operated member and said actuator means before said charging movement thereof is completed, release means operated incident to said movement of said actuator means after a predetermined travel thereof to release same for enabling the stored energy of said biasing means to cause said actuator means to operate said operated member, and means operatively associated with said latch means for causing same to operatively disconnect said actuator means and said operated member after same has been actuated, for enabling independent action of said operated member until the cycle is repeated.

14. The combination of means defined in claim 13, and rotary cam means operated by said power means, and said actuator means including cam follower means contacting said cam means during said rotation thereof to cause said energy-storing movements of said actuator means.

15. In a mechanism to cause movement of an operated member after a predetermined time interval, the combination of; actuator means movable in one direction in relation to said operated member while disconnected therefrom, energy-storing spring means acting on said actuator means and adapted to be charged with energy by said movement of said actuator means in said one direction, timer means operatively associated with said actuator means to cause said energy-storing movements thereof, latch means operatively connected to said actuator means and said operated member and operatively disconnected therefrom during said charging movement of said actuator means, said latch means including means adapted to operatively connect said operated member and said actuator means before said charging movement thereof is completed, release means operated after a predetermined travel in said one direction of said actuator means corresponding to a predetermined time interval to release same for enabling the stored energy of said spring means to cause said actuator means to move rapidly in a direction opposite from said first named direction for actuating said operated member, and means operatively associated with said latch means for causing same to operatively disconnect said actuator means and said operated member after same has been actuated, for enabling independent action of said operated member until the cycle is repeated.

16. The combination of means defined in claim 15, and a source of electric energy in a circuit associated with said mechanism, a heat-responsive bimetal power element operatively associated with said actuator means, electric heating means mounted near said bimetal element and connected in said electric circuit for heating said element and causing reciprocating movements thereof to provide a small input power force, switch means in said circuit operated automatically by said element in a continuous repetitive cycle to reduce the energy from said heating means after said element in one position thereof has been heated and to increase the energy from said heating means after said element in a second position thereof has cooled for producing said reciprocating movements and said input force, said bimetal element including means providing a snap-action thereof to delay each movement of said element from one of said positions to the other said position for establishing a predetermined period of time for said cycle, and said timer means including means for counting the number of said time-cycles to cause slowly said charging movement of said actuator means for causing operation of said release means after a predetermined number of said time cycles corresponding to said time interval.

17. In a mechanism having a movable member requiring intermittent actuation thereof by an actuating force, the combination of; a source of energy, force-producing means operated by said energy for providing a small input force, rotary means operated by said input force to cause relatively slow rotation thereof, detent means operatively connected to said rotary means, rotatable driving means including means to engage said detent means for rotation with said rotary means, actuator means operated by said driving means to be moved slowly upon rotation of said rotary means, spring means operatively connected to said actuator means for operation thereby upon said movement thereof for progressively storing energy in said spring means, latch means operatively associated with said actuator means and said member and operatively disconnecting same during said charging movement of said actuator means, but adapted to operatively connect same together substantially at the end of said movement of said actuator means, means to release said actuator means after said rotary means has rotated a predetermined amount, said release means including means causing movement of said detent means at the end of said movement of said actuator means to release said driving means for causing said actuator means to be operatively disconnected from said rotary means and for enabling said energy of said spring means to cause said actuator means to operate said member, and means operatively associated with said latch means for causing same to operatively disconnect said actuator means and said movable member after same has been actuated to enable independent action of said operated member until the cycle is repeated.

18. The combination of means defined in claim 19, and said detent means being movable in relation to said rotary means from an operative position when said detent means engages said driving means to an inoperative position when said detent means is disengaged from said driving means, manual means cooperating with said detent means and selective either to enable same to remain in said inoperative position long enough to preclude said engagement of said detent means and said driving means during the next rotation thereof or to cause said engagement at least during each rotation thereof.

19. In a control device for a refrigeration system subject to the formation of frost on a surface thereof, and heating means for melting said frost, the combination of; control means for regulating the amount of said frost forming on said surface, initiating means to effect operation of said control means for activating said heating means to start the melting of said frost when formed, a source of energy, said initiating means including force-producing means operated by said energy for providing a small input force, rotary means operated by said input force to cause relatively slow rotation thereof, actuator means operated by said rotary means and adapted to be moved slowly upon rotation of said rotary means, spring means operatively connected to said actuator means for operation thereby upon said movement thereof for progressively storing energy in said spring means, latch means operatively associated with said actuator means and operatively disconnected from said control means during said charging movement of said actuator means, but adapted to operatively connect same together at the end of said movement of said actuator means, means operatively associated with said actuator means to release said actuator means after same has traveled a predetermined amount for releasing said stored energy and for enabling said actuator means to operate said control means with the force of said spring means, means operatively associated with said latch means for causing same to operatively disconnect said actuator means and said control means after same has been actuated to enable independent action of said control means until the cycle is repeated, and means to inactivate said control means to effect termination of said frost-melting action after substantially all said frost formed on said surface has melted.

20. The combination of means defined in claim 19, and said rotary means including pinion means, and said actuator means including rack means cooperating with said pinion means during said rotation thereof to cause said energy-storing movements of said actuator means.

21. In a mechanism to cause movement of an operated member, the combination of; actuator means acting on said operated member with a relatively large actuating force to effect slow movement of said member in one direction from an initial position, biasing means for gradually storing energy during said last-named movement and acting on said operated member to oppose and balance said force of said actuator means, power means operatively associated with said actuator means and adapted to provide an input force substantially smaller than said actuating force to cause said energy-storing slow movements thereof, release means operable incident to said movement of said actuator means after a predetermined travel thereof to release same for enabling the stored energy of said biasing means to cause substantially independent action of said operated member while said actuator means returns to said initial position, so that the cycle can be repeated.

22. The combination of means defined in claim 21, and said power means including a source of energy, said power means also including force-producing means operated by said energy for providing said small input force, rotary means operated by said input force to cause relatively slow rotation thereof, detent means operatively connected to said rotary means, rotatable driving means including means to engage said detent means for rotation with said rotary means, said actuator means including means operated by said driving means to cause said energy-storing movement of said actuator means upon rotation of said rotary means for progressively storing said energy, said actuator means also including means acting on said detent means at the end of said movement of said actuator means to release said driving means for causing said actuator means to be operatively disconnected from said rotary means, and said biasing means tending to return said actuator means and said driving means to their original positions ready for another energy-storing cycle.

23. The combination of means defined in claim 21, and rotary cam means operated by said power means, and said actuator means including cam follower means contacting said cam means during said rotation thereof to cause said energy-storing movements of said actuator means.

24. The combination of means defined in claim 21, and rotary means operated by said power means, said rotary means including pinion means, and said actuator means including rack means cooperating with said pinion means during said rotation thereof to cause said energy-storing movements of said actuator means.

25. In a control device for a refrigeration machine subject to the formation of frost on a surface thereof, said refrigeration machine including defrost heating means, the combination of; control means to cause operation of said heating means for regulating the quantity of said frost forming on said surface, initiating means operatively associated with said control means to cause operation of said heating means for starting the melting of said frost after forming on said surface, said initiating means including actuator means slowly movable in one direction from an initial position and acting on said control means to effect said movement thereof until said heating means is operated to initiate the defrosting action, means biasing said actuator means for storing energy during said last-named movements and acting on said control means to oppose said movement of said actuator means in said one direction, power means operatively associated with said actuator means to cause said energy-storing movements thereof, release means operable incident to said movement of said actuator means after a predetermined travel thereof to release same for enabling the stored energy of said biasing means to act on said control means while said actuator means is returned to said initial position in a direction reverse from said first-named direction, and means to regulate the duration of said defrosting action and for causing said control means to terminate said heating means after the frost has melted, so that the cycle can be repeated.

26. The combination of means defined in claim 25, and said means to control the duration of said frost-melting action including a termination sensing member contacting some ice in said machine, force-producing means activated by said initiating means upon starting said melting action and disposed to act on said termination sensing member, said force of said force-producing means acting to cause said termination sensing member to abut against said last-named ice and tending to compress same against a fixed abutment associated with said machine and gradually move with said abutted ice as same progressively melts, and means to effect a disengagement of said control means from said termination sensing member after movement thereof a predetermined distance for terminating said frost-melting action, whereby the cycle can be repeated.

27. In a mechanism associated with an electric circuit and including electric switch means therein for intermittently opening and closing said circuit, said switch means including a pair of contacts, a bimetal element secured at one end to a fixed portion of said machine and having a generally U-shaped portion near its free end, an electric heater in said circuit for said bimetal element and controlled by said switch means, a swingable member supported substantially parallel to said element having one end hingedly connected to a fixed part of said mechanism and its free end disposed within said U-portion of said element for generally arcuate movements in relation thereto, said swingable member at said free end carrying one of said contacts, said bimetal element at one side of said U-portion carrying the other said contact to co-operate with said member-contact to comprise said switch means, a leaf-spring having one end in a hinged connection with a fixed portion of said mechanism and its other end connected to said swingable member at a position to cause said member to snap from one side of said U-portion to the other side thereof for opening said contacts after said bimetal element is warmed by said heater, and to snap back to said one side of said U-portion upon cooling of said bimetal element to close said contacts and again energize said heater to repeat the cycle.

28. In a control device for a refrigeration machine having a cooling system subject to the formation of frost on a surface thereof, and an electric circuit having a source of electric energy associated with said machine, and an electric motor in said circuit to affect operation of said cooling system, and electrically controlled heating means for regulating the quantity of said frost forming on said surface, the combination of; switch means in said circuit to control said heating means and operatively associated with said motor, initiating means operatively associated with said switch means to cause operation thereof for starting the heating means for melting said frost formed on said surface, means to terminate said heating means after said frost has melted, said switch means including fixed contact means and movable contact means cooperating with said fixed contact means and controlled by said initiating means and said terminating means to start and stop said heating means, respectively, in a normal total travel of said movable contact means, said motor being inactive whenever said heating means is active, and delay means including means adapted temporarily to hold said movable contact means for a period of time in a position between the extremes of said total travel to preclude operation of said motor after terminating said heating means, said delay means including means automatically to release said movable contact means at the end of said time-period to return to one extreme of travel for activating said motor.

29. The combination of means defined in claim 28, and said delay means including a bimetal element responsive to ambient temperature changes produced by said heating means when activated, and said holding means comprising a latch portion of said bimetal element and when warped in one direction being adapted to engage said movable contact means after said ambient temperature rises to a predetermined value, and said latch portion being automatically moved clear of said movable contact means when said bimetal element warps in a reverse direction when the refrigeration machine cools a predetermined amount to re-start said motor, and the cycle is repeated.

30. The combination of means defined in claim 28, and said mechanism including timing means to cause operation of said initiating means after a predetermined time interval, and said delay means comprising a member including a latch portion adapted to engage said movable contact means after said heating action is terminated, said member including means temporarily operated by said timing means for a predetermined time interval as a result of said engagement of said movable contact means with said member to automatically cause said latch means to release said movable contact means to restart the motor after said time interval, and the cycle is repeated.

31. In a control device for a refrigeration machine having a cooling system subject to the formation of frost on a surface thereof, and an electric circuit having a source of electric energy associated with said machine, and an electric motor in said circuit to affect operation of said cooling system, and electrically controlled heating means for regulating the quantity of said frost forming on said surface, the combination of; switch means in said circuit to control said heating means and operatively associated with said motor, initiating means operatively associated with said switch means to cause operation thereof for starting the heating means for melting said frost formed on said surface, means to terminate said heating means after said frost has melted, said motor being inactive whenever said heating means is active, and delay means including a bimetal element adapted to be operatively connected to said switch means to preclude temporarily operation of said motor after inactivating said heating means until a predetermined temperature is attained, said bimetal element including means to automatically release said switch means after said predetermined temperature has been attained to cause operation of said motor.

32. In a control device for a refrigeration machine subject to the formation of frost on a surface thereof, and an electric circuit having a source of electric energy associated with said machine, and an electric motor in said circuit to provide power for an operating function of said machine, and electrically controlled heating means for regulating the quantity of said frost forming on said surface, the combination of; switch means in said circuit to control said heating means and operatively associated with said motor, timing means operatively associated with said switch means to cause operation thereof after a predetermined time interval for starting the heating means to melt said frost formed on said surface, means to terminate said heating means after said frost has melted, said motor being inactive whenever said heating means is active, delay means including a bimetal element adapted to warp in one direction in response to an increase in the ambient temperature produced by said heating means when activated, said bimetal element including means cooperating with said switch means for causing said switch means after said warping action of said element automatically to preclude temporarily operation of said motor upon inactivating said heating means, and for causing said switch means to enable automatic activation of said motor after said bimetal element warps in a reverse direction when the refrigeration machine cools a predetermined amount.

33. In a control device for a refrigeration machine subject to the formation of frost on a surface thereof, and an electric circuit having a source of electric energy associated with said machine, and a compressor operated by an electric motor in said circuit, and electrically controlled heating means for regulating the quantity of said frost forming on said surface, the combination of; switch means in said circuit to control said heating means, initiating means including timing means operatively associated with said switch means to cause operation thereof after a predetermined time interval for starting the heating means to melt said frost formed on said surface, means to terminate said heating means after said frost has melted, manually operable second switch means in said circuit having two selectable operating positions and operatively associated with said timing means to cause operation thereof at all times when said second switch means resides in one of said two positions, said second switch means in said other of said two positions being arranged in said circuit to cause operation of said timing means only while said compressor is in operation.

34. In a control device for a refrigeration machine subject to the formation of frost on a surface thereof, and an electric circuit having a source of electric energy associated with said machine, and a compressor operated by an electric motor in said circuit, and electrically controlled heating means for regulating the quantity of said frost forming on said surface, the combination of; switch means in said circuit to control said heating means, initiating means including timing means operatively associated with said switch means to cause operation thereof after a predetermined time interval for starting the heating means to melt said frost formed on said surface, means to terminate said heating means after said frost has melted, means operable in one condition to cause operation of said timing means only while the compressor motor is in operation, and in another condition to cause operation of said timing means at all times said refrigeration machine is in operation, and manually operated means to select one of said conditions for changing said predetermined time interval to accommodate different ambient atmospheric conditions in which the refrigeration machine is placed in operation.

35. In a control device for refrigeration apparatus having a surface subject to the formation of frost adjacent thereto, the combination comprising; control means including means for causing a melting of said formation of said frost, a vessel of ice subjectable to said melting means, a sensing member having a portion disposed within said vessel and normally disconnected from said control means, initiating means adapted to act on said control means to cause operation thereof and to cause operative connection of said control means and said sensing member substantially upon initiating a melting action of said frost, force-producing means activated by said initiating means to cause said then-connected sensing member to abut against said ice in said vessel tending to compress the ice against a wall of said vessel and gradually move with said ice as it progressively melts to effect a termination of said melting action, and sealing means operatively associated with said sensing member to enclose the ice in said vessel and seal the ice therein from the surrounding atmosphere at least when said heating means is inactive for precluding evaporation of the contents of said vessel.

36. In a control device associated with a refrigeration machine having a surface subject to the formation of frost thereon and heating means to melt the frost, the combination comprising; means to control said heating means for periodic melting of said frost forming on said surface, actuating means adapted to cause operation of said control means for initiating a melting of said frost, a vessel of ice fixed in relation to said machine, a termination sensing member having a portion disposed within said vessel and embedded in the ice therein and disconnected from said control means during normal operation of said machine, means to operatively connect said control means to said sensing member upon said initiation of said melting action, biasing means acting on said control means to cause said then-connected sensing member portion to abut against the ice in said vessel tending to compress same between said sensing member and a wall of said vessel and to move with said ice as it progressively melts to form a thermally-varying frozen-liquid link between said sensing member and said wall to sustain said defrosting action, means to effect a disengagement of said operative connection after a predetermined travel of said sensing member during said last-named movement, said biasing means then returning said control means to its original position corresponding to said normal operation of said machine for terminating said defrosting action, means to return said sensing member upon said disengagement to its original position, and a layer of non-evaporating liquid lighter than water resting on top of said ice within said vessel to seal the ice for preventing evaporation thereof, and said termination sensing member portion being adapted to project through said liquid into said ice.

37. In a mechanism associated with an electric circuit and including electric switch means therein, said switch means including a pair of contacts for intermittently opening and closing said circuit, a bimetal element secured at one end to a fixed portion of said machine and its free end movable in an arcuate reciprocating path as said bimetal element warps upon heating and cooling thereof, an electric heater in said circuit for said bimetal element and controlled by said switch means, a swingable element supported substantially parallel to said bimetal element and having one end hingedly connected to a fixed part of said mechanism and its free end disposed for generally reciprocating arcuate movements from one position to another position, a first of said two elements including a generally U-shaped portion near its said free end for movements therewith, the second of said two elements having its free end disposed within said U-shaped portion, said second element near said free end carrying one of said contacts, said first element at one side of said U-shaped portion carrying the other said contact to cooperate with said one contact to comprise said switch means, a leaf-spring having one end in a hinged connection with a fixed portion of said machine and its other end connected to said swingable element at a position to cause said swingable element to snap from one of said positions thereof to said other position for opening said contacts after said bimetal element is warmed by said heater, and to snap back to said last-named one position upon cooling of said bimetal element to close said contacts and again energize said heater to repeat the cycle continuously.

38. The combination of means defined in claim 37, and said mechanism including a member actuated after a predetermined time interval, means to initiate operation of said last-named actuated member, said initiating means including a mechanism operated intermittently by one of said elements upon each of said continuous cycles to count the number of said cycles, said counting mechanism including means to cause said actuation of said member after a predetermined number of said time cycles corresponding to said time interval.

39. The combination of means defined in claim 35, and said mechanism including a member actuated after a predetermined time interval, means to initiate operation of said last-named actuated member, said initiating means including ratchet means having a predetermined number of ratchet teeth, ratchet actuating means operated as a result of said reciprocating movements of said bimetal element and adapted to move said ratchet means a portion of its total travel upon one said cycle of said bimetal element, and said initiating means including means to cause said actuation of said operated member after a predetermined number of said cycles of said bimetal element corresponding to said time interval.

40. In a defrost control apparatus for a refrigeration mechanism having a cooling system subject to the formation of frost on a surface thereof, and en electric circuit having a source of electric energy associated with said mechanism, and an electric heater for melting said frost forming on said surface, and an electric device in said circuit for affecting operation of said cooling system, the combination comprising; switch means in said circuit to control said heater and operatively associated with said device, initiating means operatively associated with said switch means to affect operation thereof for energizing said heater to melt said frost, means to terminate said heater when said frost melts, said switch means including fixed contact means and movable contact means cooperating with said fixed contact means and controlled by said initiating means and said terminating means to regulate said operation of said heater in a normal total travel of said movable contact means, and means adapted temporarily to hold said movable contact means in a position between the extremes of said total travel to cause one type of operation of said device, said holding means including means automatically to release said movable contact means to return to one extreme of travel for causing another type of operation of said device.

41. In a control device for a refrigeration machine subject to the formation of ice on a surface thereof, the combination comprising; control means including means for causing a melting of said ice forming on said surface, initiating means including actuating means adapted to be operatively connected to said control means for causing operation thereof to initiate the melting of said ice, said initiating means including cam means cooperating with said actuating means to cause operation thereof for operating said control means after a predetermined travel of said cam means, said initiating means including a bimetal element intermittently operated through a predetermined time cycle and adapted to be operatively connected to said cam means for causing periodic movement thereof corresponding to each said intermittent cycle operation of said element, heating means for causing said operation of said bimetal element, switch means operated by said element to energize said heating means after said element cools and de-energize said heating means after said element is heated to provide said intermittent operation thereof, and means to terminate said ice-melting-action including termination sensing means contacting some ice subjectable to said ice-melting means, force-producing means activated by said initiating means upon starting said melting action and disposed to act on said termination sensing means for causing same to abut against said last-named ice and gradually move therewith as said ice progressively melts, until said ice-melting action is terminated.

42. The combination of elements defined in claim 8, and said frozen liquid comprising ice, and a layer of non-evaporating liquid on top of said ice within said vessel to seal the ice for preventing evaporation thereof when melted.

References Cited

UNITED STATES PATENTS

| 2,436,735 | 2/1948 | Walder et al. | 60—23 X |
| 2,487,154 | 11/1949 | Llyod | 60—23 X |
| 2,624,180 | 1/1953 | Grimshaw | 62—140 |
| 2,645,905 | 7/1953 | Atchison | 62—140 |
| 2,744,389 | 5/1956 | Raney | 62—140 |
| 2,888,808 | 6/1959 | Jacobs | 62—234 X |
| 2,949,016 | 8/1960 | Thorner | 62—154 X |
| 3,022,640 | 2/1962 | Hubacker | 62—276 |
| 3,033,004 | 5/1962 | Matthies | 62—140 |
| 2,117,066 | 5/1938 | Liverance | 200—61.19 X |
| 2,463,216 | 3/1949 | Thornbery | 200—153 X |

ROBERT A. O'LEARY, *Primary Examiner.*

W. E. WAYNER, *Assistant Examiner.*